United States Patent [19]

Okita et al.

[11] Patent Number: 4,611,697
[45] Date of Patent: Sep. 16, 1986

[54] ELECTROMAGNETIC POWDER COUPLING WITH COOLING FINS

[75] Inventors: Ryosuke Okita, Aioi; Kiyohide Okamoto, Himeji, both of Japan

[73] Assignee: Mitsubishi Denki Kabushiki Kaisha, Tokyo, Japan

[21] Appl. No.: 510,977

[22] Filed: Jul. 5, 1983

[30] Foreign Application Priority Data

| Jul. 5, 1982 [JP] | Japan | 57-102623 |
| Jul. 5, 1982 [JP] | Japan | 57-102624 |
| Jul. 5, 1982 [JP] | Japan | 57-102626 |
| Aug. 20, 1982 [JP] | Japan | 57-126516 |

[51] Int. Cl.⁴ .................. F16D 37/02; F16D 13/72
[52] U.S. Cl. .................. 192/21.5; 192/113 A
[58] Field of Search ............ 192/21.5, 113 A, 70.12, 192/58 B

[56] References Cited

U.S. PATENT DOCUMENTS

| 1,671,443 | 5/1928 | Norris | 192/113 A |
| 2,144,298 | 1/1939 | Padgett | 192/113 A X |
| 2,197,232 | 4/1940 | Wood | 192/113 A |
| 2,544,360 | 3/1951 | Schmidt | 192/21.5 X |
| 2,649,935 | 8/1953 | Tack | 192/21.5 X |
| 2,685,947 | 8/1954 | Votrian | 192/21.5 |
| 2,690,241 | 9/1954 | Bachman | 192/21.5 |
| 2,746,587 | 5/1956 | Spase | 192/113 A X |
| 2,785,781 | 3/1957 | Johansen | 192/113 A X |
| 2,804,955 | 9/1957 | Gill, Jr. | 192/21.5 |
| 2,837,191 | 6/1958 | Terry, III | 192/21.5 X |
| 2,886,151 | 5/1959 | Winslow | 192/21.5 |
| 2,897,931 | 8/1959 | Didszuns | 192/21.5 |
| 2,910,148 | 10/1959 | Ferrell et al. | 192/82 T X |
| 3,216,542 | 11/1965 | Comstock, 3rd | 192/21.5 |
| 3,415,346 | 12/1968 | Boeskool et al. | 192/21.5 |
| 3,581,855 | 6/1971 | Taeffner et al. | 192/113 A X |
| 3,889,784 | 6/1975 | Hanks | 119/113 A X |

FOREIGN PATENT DOCUMENTS

| 0162963 | 4/1953 | Australia | 192/21.5 |
| 0094134 | 6/1982 | Japan | 192/21.5 |
| 0043983 | 11/1960 | Poland | 192/21.5 |
| 0322746 | 8/1957 | Switzerland | 192/21.5 |

Primary Examiner—Rodney H. Bonck
Assistant Examiner—David A. Testardi
Attorney, Agent, or Firm—Robert E. Burns; Emmanuel J. Lobato; Bruce L. Adams

[57] ABSTRACT

An electromagnetic coupling transmits torque between a first and a second relatively rotatable rotary member through the use of magnetically solidified magnetic particles between the air gap defined between the rotary members. The coupling comprises a plurality of cooling fins on the outer periphery of the outer rotary member opposite to the inner pole face of the member, thereby efficiently cooling undesired heat generated in the magnetic particles.

2 Claims, 2 Drawing Figures

ELECTROMAGNETIC POWDER COUPLING WITH COOLING FINS

BACKGROUND OF THE INVENTION

This invention relates to electromagnetic couplings, and more particularly to electromagnetic couplings utilizing magnetizable particles for transmitting torque between relatively rotatable rotary members.

Electromagnetic couplings are known as being usable as brakes, clutches and the like. U.S. Pat. No. 2,804,955 discloses one type of electromagnetic coupling in which a driven member including a magnetizing coil is surrounded by a driving member with an annular air gap provided therebetween for containing therein magnetizable torque transmitting particles. U.S. Pat. No. 3,249,184 discloses another type of elecgromagnetic coupling in which a relatively thin drum portion is inserted within an air gap formed between an outer driving rotor member and an inner stationary field structure including a field winding. This patent also discloses an arrangement for mounting the drive member to the input shaft.

In conventional electromagnetic couplings including those disclosed in the above mentioned patents, the magnetizable particles or the torque transmitting medium within the air gap between relatively rotatable members are subject to a heating problem when there is a relative rotary motion between the rotatable members because of the slippage or the friction between each of the magnetizable particles contained in the air gap. If this heating of the particles is not efficiently removed, the temperature of the particles may raise to such an extent that the particles weld to each other and their magnetic properties change, decreasing the reliability of the electromagnetic coupling.

SUMMARY OF THE INVENTION

Accordingly, an object of the present invention is to provide an electromagnetic coupling in which the magnetizable particles are prevented from being heated to an undesirably high temperature.

Another object of the present invention is to provide an electromagnetic coupling provided with a cooling means simple in construction and reliable in operation.

With the above object in view, the present invention resides in an electromagnetic coupling comprising a first and a second rotary member, the first member being connectable to an external driving element and having an annular pole face facing inward, the second member being connectable to an external driven element and having an annular pole face that faces outward. The second rotary member is supported within the first rotary member in a relatively rotatable relationship, defining an annular air gap between the pole faces of the first and the second rotary members. Magnetic particles are disposed within the air gap defined between the first and the second rotary members. Magnetic flux generating means which may be a toroidal field coil, generate a magnetic flux passing through the pole faces of the rotary members and across the air gap containing the magnetic particles. When generated, the magnetic flux magnetically solidifies the magnetic particles between the rotary members thereby enabling a torque to be transmitted from one rotary member to the other. The magnetic coupling further includes a plurality of cooling fins disposed on the outer periphery of the first outer rotary member adjacent to its pole face. In one embodiment of the invention, the first rotary member is composed of a pole face section and a support bracket section, and the cooling fins are disposed on the pole face section on the opposite side of the pole face. Since the cooling fins are positioned close to the pole face which defines the air gap in which the particles are subjected to heating, the cooling is efficiently achieved.

BRIEF DESCRIPTION OF THE DRAWINGS

The invention will become more readily apparent from the following description of the preferred embodiments taken in conjunction with the accompanying drawings, in which.

DESCRIPTION OF THE PREFERRED EMBODIMENT

Figure 1:
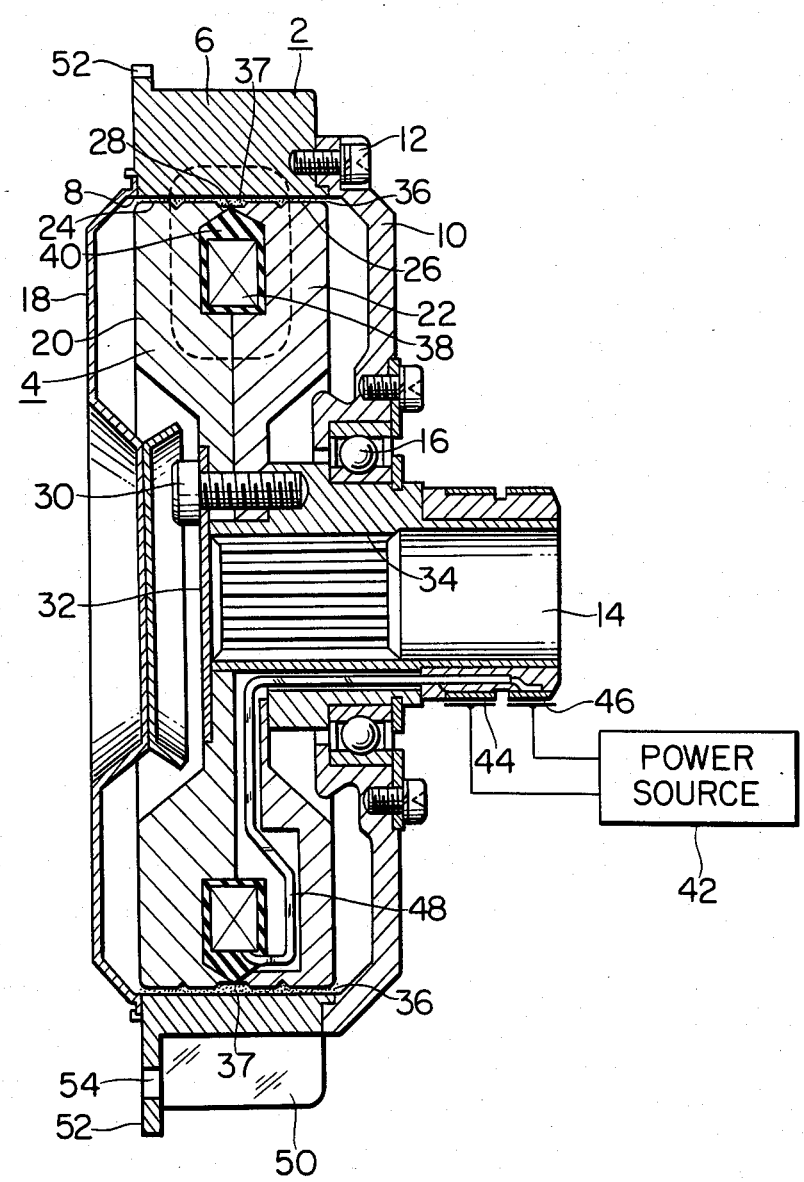
FIG. 1 is a sectional view of an electromagnetic coupling constructed in accordance with the teaching of the present invention.

FIG. 1 shows an electromagnetic coupling constructed in accordance with the teaching of the present invention, and the coupling comprises a first driving rotary member 2 and a second driven rotary member 4. The first or outer rotary member 2 is composed of a ring-shaped pole face section 6 having on its inner peripheral surface an annular or cylindrical pole face 8 and a substantially disc-shaped support bracket section 10 attached at its outer periphery to one side of the annular pole face section 6 by means of bolts 12. The inner periphery of the support bracket section 10 is rotatably connected to an output shaft 14 through a ball bearing 16. The first rotary member 2 also comprises a cover plate 18 secured to the pole face section 6 for closing the inner space within the first rotary member 2.

The output shaft 14 has mounted on the end within the space in the first rotary member 2 a pair of rim elements 20 and 22 of a magnetic material. The rim elements 20 and 22 together with the output shaft 14 constitute the second or driven rotary member 4. The rim elements 20 and 22 when assembled on the output shaft 14 define two cylindrical pole faces 24 and 26 separated from each other by a non-magnetic region such as an air gap or non-magnetic piece 28. The rim elements 20 and 22 are secured the output shaft 14 by means of screws 30 extending through an end plate 32. It is to be understood that the output shaft 14 can be mechanically connected to an external driven element (not shown) through the use of splines 34 provided on the inner surface of the hollow output shaft 14. The pole faces 24 and 26 of the second rotary member 4 are positioned in a concentric and facing relationship with respect to the pole face 8 of the first rotary member 2 so that an annular cylindrical air gap 36 is defined between the pole faces 8, 24 and 26.

The electromagnetic coupling also comprises an amount of magnetic powder or fine particles of a magnetic material 37 as well known in the art. The magnetic particles are disposed within the space defined by the first rotary member 2 and the second rotary member 4 and therefore they are also present in the air gap 36 between the pole faces of the first and the second rotary members 2 and 4.

The electromagnetic coupling further comprises a magnetic flux generating means or a toroidal coil 38 which may be of a known construction and disposed within an annular cavity formed between the rim elements 20 and 22 of the second rotary member 4 and embedded in an electrically insulating material such as a synthetic resin 40. The electric current for exciting the field coil 38 is supplied from an external power source 42 connected to a pair of slip rings 44 and 46 disposed on the output shaft 14 and connected by electrical conductors 48 to the coil 38 between the rim elements 20 and 22.

In operation, the first driving member 2 can be rotated and the second driven member 4 may be selectively driven by the first rotary member or kept stationary in spite of the movement of the first drive member due to the control of the magnetic field established by the toroidal coil 38 within the second rotary member 4. During operation, heat generates in the magnetic particles 37 within the air gap 36 between the pole faces 8, 24 and 26 due to the friction between each particle and between the particles and the pole faces. If this heat is not removed, it can accumulate to such an extent that the physical properties of the magnetic particles 37 deteriorate and the particles can even weld to each other, reducing the reliability of the coupling.

Figure 2:
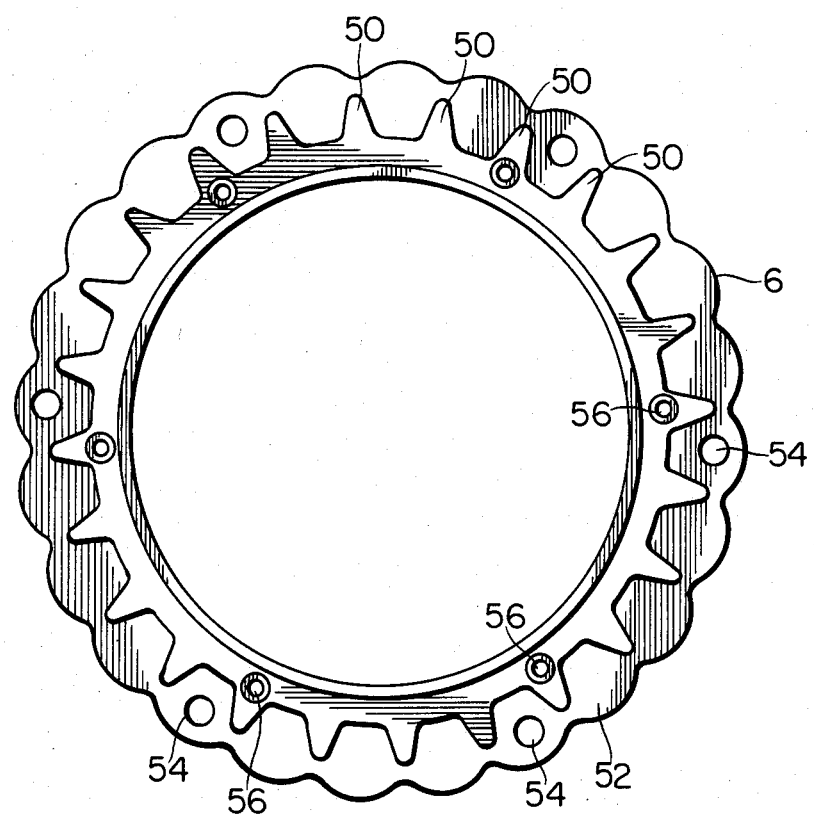
FIG. 2 is a plan view of a pole face section of the outer rotary member of the electromagnetic coupling shown in FIG. 1.

According to the present invention, therefore, the electromagnetic coupling is provided with cooling means for removing the heat from the magnetic particles. In FIGS. 1 and 2, one preferred embodiment of the invention is illustrated, in which the first rotary member 2 and more particularly the ringshaped pole face section 6 is provided on its outer cylindrical surface with a plurality of cooling fins 50 extending in a radial plane containing the central axis of the coupling. The pole face section 6 may have a ring-shaped mounting flange 52 as shown in FIGS. 1 and 2 which is a flange radially and circumferentially extending from the end of the pole face section and connectable to the unillustrated driving element through the bolt holes 54 formed in the mounting fange 52. The cooling fins 50 and the mounting flange 52 are preferably integrally formed with the pole face section 6 such as by cold forging. The pole face section 6 also has a plurality of threaded holes 56 in the end opposite to the end on which the mounting flange 52 is disposed for receiving bolts 12 for securing the support bracket 10. It is to be noted that the threaded holes 56 are formed partly in the end face of the cooling fins 50, thereby eliminating the need for a thick and heavy pole face section. As best shown in FIG. 2, the outer periphery of the mounting flange 52 may be shaped in a wavy form having alternating troughs and crest. With this measure, the weight of the mounting flange 52 can be decreased while providing a proper surface for seating the screw or bolt. Also the surface area of the flange 52 is also increased to further increase the cooling efficiency.

As apparent from the foregoing description of the preferred embodiment of the present invention, since the air gap in which heat generates is positioned at the outer most peripheral portion of the electromagnetic coupling and cooling fins and the mounting flange are disposed in the vicinity of the heat generating air gap, the heat generated is efficiently dissipated through the cooling fins and the mounting flange, significantly improving cooling efficiency. Also, the cooling fins and the mounting flange are disposed on the driving rotary member which always rotates and is cooled, additionally increasing the cooling efficiency. The cooling efficiency is further improved by the wavy-shaped of the periphery of the mounting flange which provides additional surface area. The cooling fins and the mounting flange are integrally formed with the pole face section of the first rotary member such as by cold forging, so that the heat conduction to the fins and the flange is improved to further increase the cooling efficiency.

The pole face section is integrally formed with a magnetic material, and the bolt holes for securing the mounting flange to the external driving element are formed in the flange at the position between the cooling fins, and the threaded holes for receiving screws for the connection of the support bracket are formed in the thick base portions of the cooling fins. Therefore, the diameter of the mounting flange can be made small and there is less limitation on the machining and the strength of screws. Also since the outer diameter of the pole face section less the cooling fins is determined by the sectional area of the entire pole face section including the fins in the magnetic circuit, the pole face section can be designed to be small and light-weight. The wavy-shaped of the mounting flange as shown in FIG. 2 can be obtained by a cold forging of the cooling fins on the mounting flange. The of the wavyshape of the mounting flange can be utilized as the seating surface for the mounting bolts, making the flange lighter than that without the wavy periphery. Alternatively, bolts of larger size can be used for the same weight flange, enabling the reduction of the number of bolts used.

The toroidal electromagnetic coil is disposed within the inner driven member. Therefore the diameter of the coil is small and the weight of the coil winding is small for a given energization or ampere turns. Also the length of the magnetic circuit around the coil is shorter which can save the magnetic material, decreasing the weight and the size of the coupling.

When the first rotary member is formed by cold forging to form the cooling fins and the mounting flange, the manufacturing process is very simple, reducing manufacturing time, and decreasing waste of material, resulting in a less expensive coupling.

What is claimed is:

1. An electromagnetic powder coupling comprising an outer rotary driving member connectable to an external driving element and an inner rotary driven member connectable to an external element to be driven, said inner driven member comprising a hub having means for connecting said hub to an external element to be driven, two rim elements mounted coaxially on said hub and having cylindrical outwardly facing pole faces, a toroidal coil disposed in an annular cavity between said rim elements and means for supplying electric current to said coil, and said outer driving member comprising a cold forged cylindrical member having on its inner side a cylindrical inwardly facing pole face spaced radially from said pole faces of said inner member and having on its outer side a multiplicity of circumferentially spaced, axially extending radially projecting integral cooling fins, said cylindrical member having in a first axial end face a plurality of circumferentially spaced tapped holes, said holes being disposed at the bases of circumferentially spaced fins, a disc-shaped support bracket rotatably mounted on said hub and extending radially to said first axial end face of said cylindrical member, screws extending through holes in said support bracket and screwed into said tapped holes in said cylindrical member to secure said cylindrical member to said support bracket, said cylindrical member having at a second axial end opposite said first axial end a planar radially projecting mounting flange integral with said cylindrical member and said fins, said mounting flange extending radially outwardly beyond said fins and having a wavy outer peripheral edge with troughs of waves coinciding with said fins and crests of waves disposed between said fins to provide wider portions of said flange between said fins, said flange having a plurality of circumferentially spaced mounting holes for reception of elements for connecting said cylindrical member to a driving element, said mounting holes being disposed in wider portions of said flange between fins, magnetic particles in the space between the pole face of said outer member and pole faces of said inner member, and, a cover plate secured to said second axial end of said cylindrical member.

2. An electromagnetic powder coupling according to claim 1, in which said mounting holes in said mounting flange are disposed radially inwardly of outer edges of the fins between which said mounting holes are disposed.

* * * * *